May 27, 1941.  F. R. McFARLAND  2,243,111
MOTOR VEHICLE
Filed Feb. 29, 1940   2 Sheets-Sheet 1

INVENTOR.
Forest R. McFarland
BY
Tibbetts & Hart
ATTORNEYS

May 27, 1941.  F. R. McFARLAND  2,243,111
MOTOR VEHICLE
Filed Feb. 29, 1940  2 Sheets-Sheet 2
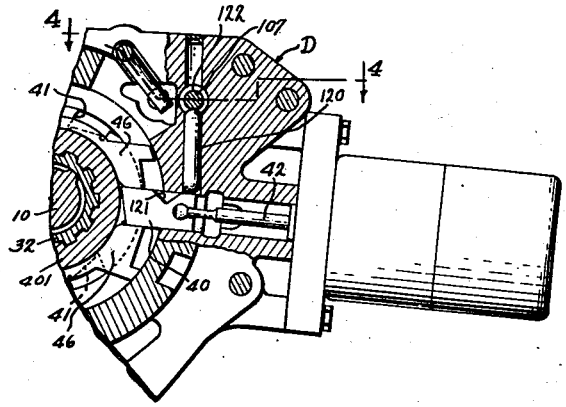
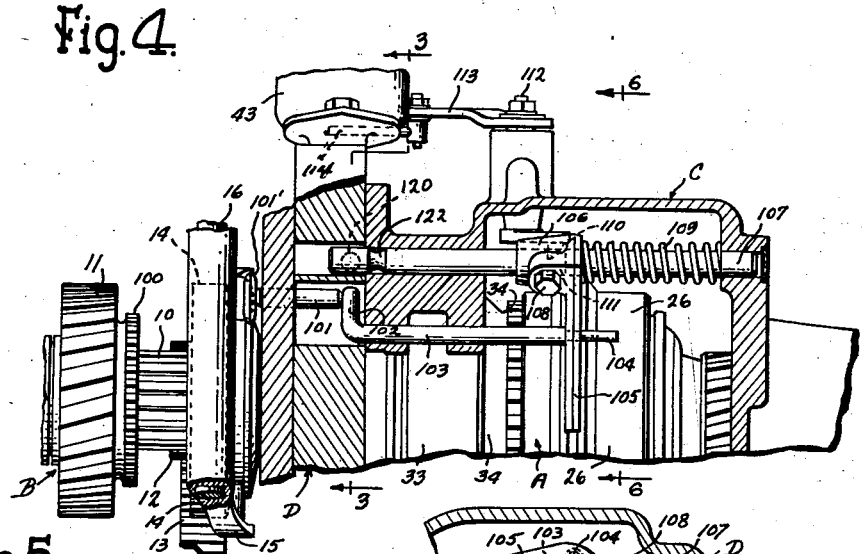
INVENTOR.
Forest R. McFarland
BY
Tibbetts & Hart
ATTORNEYS Patented May 27, 1941

2,243,111

UNITED STATES PATENT OFFICE 2,423,111

MOTOR VEHICLE

Forest R. McFarland, Ferndale, Mich., assignor to Packard Motor Car Company, Detroit, Mich., a corporation of Michigan Application February 29, 1940, Serial No. 321,452

6 Claims. (Cl. 74—290)

This invention relates to motor vehicles and more particularly to transmissions.

Many motor vehicles are now equipped with transmissions having a shaft that can be driven by change speed gearing and additional mechanism between such shaft and a tail shaft for modifying the drive under certain conditions. Such modifying mechanism usually includes planetary gearing having a sun gear that can be held or released by a controlled pawl, a shiftable clutch drivingly connecting the planetary gearing and the tail shaft and shiftable to establish a two-way direct drive from the transmission shaft to the tail shaft, and a one-way clutch between the transmission shaft and the tail shaft. The selector clutch is usually shiftable either by a driver operative means or by means operated by and with the reverse drive shift mechanism in the transmission. The pawl is usually under control of a solenoid responsive to driver operative means and automatic means, such as a governor.

Ordinarily the automatic control operates to cause the pawl to engage the sun gear of the planetary gearing while the vehicle travels above some predetermined speed and the pawl is released from the sun gear below such predetermined speed. Heretofore it has been possible to shift the pawl into sun gear holding relation while the control clutch is in driving relation between the transmission shaft and the tail shaft, and also to shift the clutch into direct driving relation between the shafts while the pawl engages the sun gear. Obviously, in either event, breakage of parts will occur.

An object of the invention is to provide clutch and pawl control mechanism for transmission drive modifying mechanism of the class described that can be shifted only when the mechanism is ready to be changed.

Another object of the invention is to provide a transmission with speed modifying mechanism, of the planetary gearing type referred to, in which both the reverse shift mechanism of the transmission and the driver operated mechanism act similarly upon the clutch operating mechanism to establish direct two-way drive but neither being operable to establish the two-way drive until the planetary gearing is idling.

Still another object of the invention is to provide a clutch and planetary pawl control operable by separate mechanisms, for transmission drive modifying mechanism, with locking means that is effective to prevent actuation of the control thereof to establish direct drive by either mechanism until ready for the shift.

Other objects of the invention will appear from the following description taken in connection with the drawings, which form a part of this specification, and in which:

Fig. 3 is a fragmentary sectional view of the control pawl for the planetary gearing of drive modifying mechanism with the clutch shifting mechanism in locked position, taken on line 3—3 of Fig. 4;

Fig. 4 is a fragmentary sectional view of the drive modifying mechanism taken on line 4—4 of Fig. 3;

Fig. 5 is a fragmentary sectional view similar to Fig. 3, but showing the planetary control pawl in released position;

Fig. 6 is a sectional view taken on line 6—6 of Fig. 4.

Figure 1:
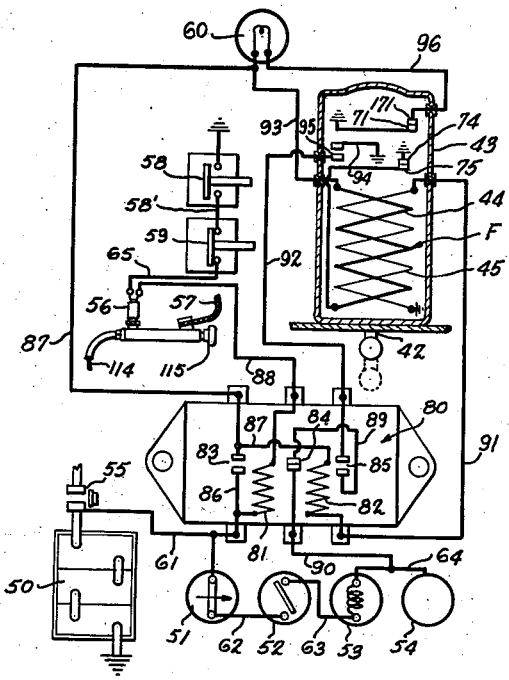
Fig. 1 is a diagrammatic showing of the electric system for controlling drive modifying mechanism.
Figure 2:
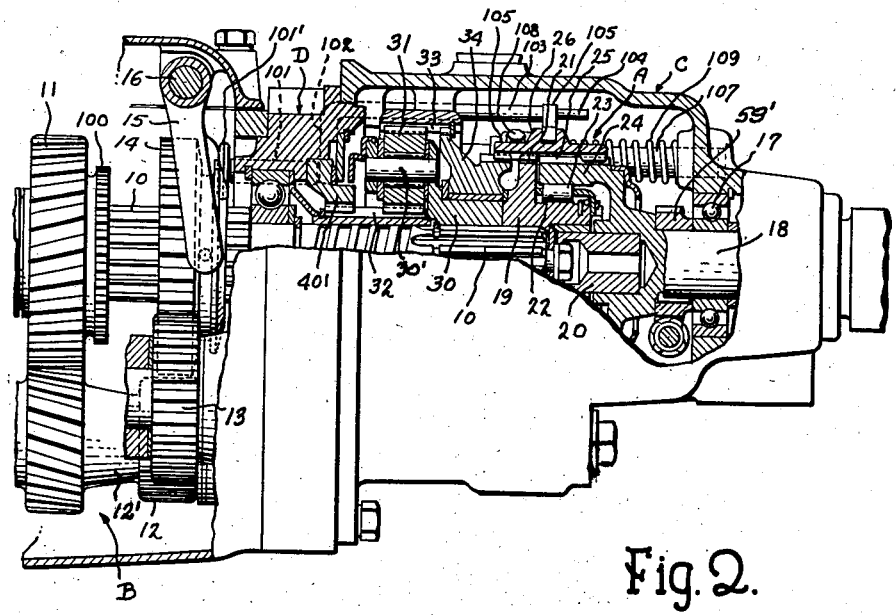
Fig. 2 is a side elevation, partly broken away, of a transmission incorporating the invention.

The drive modifying mechanism indicated at A is arranged at the rear of the change speed gear transmission B and both are carried in a casing C having a partition wall D. The transmission is of a conventional change speed gearing type commonly employed with motor vehicles and includes a driven shaft 10, a low forward speed drive gear 11, a reverse idler gear 13 driven by gear 12, splined on the lay shaft 12', and a gear and clutch member 14 slidably splined on shaft 10 to drivingly engage either the low speed drive gear or the reverse idler gear. The gear and clutch member can be shifted by arms 15 mounted on shaft 16 and actuated by suitable manually operable mechanism (not shown).

Driven transmission shaft 10 extends through the casing partition wall D and aligned rearwardly thereof is the tail shaft 18 suitably mounted in bearings 17 in the casing rear wall. A clutch hub 19 is splined to the rear end of the driven shaft and at its rear end receives the tail shaft pilot 20. Hub 19 also has a tooth clutch plate 21 and cam surfaces 22 formed therewith, the cam surfaces having rollers 23 mounted thereon. The tail shaft has an enlarged forward annular rim portion 24, the interior surface of which acts as a bearing for the rollers 23 and the outer surface of which is formed with clutch teeth 25. A shiftable sleeve clutch member 26 drivingly engages the clutch teeth 25 in all positions of its adjustment and can be shifted into or out of engagement with the clutch plate 21. When clutch member 26 engages clutch plate 21 direct two-way drive will be established from the driven shaft 10 to the tail shaft 18. When the clutch 26 is disengaged from clutch plate 21 then the one-way drive can be established by the overrunning clutch rollers 23 wedging between the cam surfaces 22 on the hub 19 and the tail shaft rim portion 24.

Between clutch plate 21 and the casing partition wall D is arranged planetary gearing by means of which a modified drive can be established from the transmission shaft 10 to the tail shaft. A carrier 30 is splined to the driven shaft 10 and carries pins 30' for supporting planet gears 31. The planet gears mesh with the sun gear 32, that is rotatably mounted on shaft 10, and with ring gear 33. An extension 34 is drivingly splined to the planetary ring gear and is constantly engaged by the sleeve clutch 26 to establish a drive from the planetary gearing to the tail shaft when the sun gear is held stationary. The sun gear has a ring extension 401 splined thereon having recesses 41 in its periphery.

The sun gear lies partly in a recess in the partition wall D and pawl 40 is slidably mounted in the wall for movement into or out of sun gear recesses 41. When engaged in one of such recesses, the pawl will hold the sun gear from rotating so that the planetary is in driving relation to modify the drive from shaft 10 to the tail shaft, and when the pawl is released from the sun gear, the planetary gearing idles.

The pawl is controlled by an electric and spring system having several types of control means. The pawl has a stem 42 that extends into housing 43 fixed on casing C in which is arranged a solenoid F including two coils 44 and 45. These coils when energized provide for moving the rod and connected pawl in a direction to enter one of the recesses 41 in the sun gear but entrance to the recesses is prevented by an apertured blocker member 46 extending in the path of such movement. Upon reversal of torque this blocker member will shift with the sun gear so that its aperture registers with one of the recesses 41 allowing the pawl to pass through to engage and hold the sun gear from rotating. Likewise upon torque reversal with the solenoid deenergized, the pawl can be removed from the sun gear recess by suitable spring release means 47.

The electrical system for controlling the engine ignition and the solenoid includes the motor vehicle battery 50, ammeter 51, ignition switch 52, coil 53, ignition distributor 54 and engine starter 55. The ignition switch, ammeter and a manually controlled switch 56 are arranged at the vehicle instrument panel 57. The dash switch, a governor controlled switch 58 and a foot operated kick switch 59 are connected in series. Also located at the instrument panel is an indicator light bulb 60. There is a connection 61 between the battery 50 and the ammeter 51, another connection 62 between the ammeter and the ignition switch 52, another connection 63 between the ignition switch and the coil 53 and a connection 64 between the coil and the distributor 54. Switch 58 is grounded and there is a connection 58' between this switch and the kick switch 59. There is a connection 65 between the kick switch and dash switch 56. The governor switch is controlled by mechanism (not shown) driven by the tail shaft gear 59' and the kick switch is operated by the vehicle accelerator pedal mechanism (not shown). For a detailed showing and more complete description of the electrical system and control thereof, reference may be had to application Serial No. 279,165, filed by Clyde R. Paton, June 14, 1939.

In the solenoid housing is provided a bracket structure 68 within which a slidable armature 69 having a flanged cap 70 is mounted, the coil spring 47 being arranged between the bracket and flange and around the armature. Rod 42 extends axially through the armature in slidable relation therewith and on the end of the rod, remote from the pawl, is a switch contact 71 adapted to cooperate with grounded contact 171. Within the hollow portion of the armature is a coil spring 72 bearing at one end against the flanged cap 70 and at the other end against a retainer 73 fixed on the pawl rod. Spring 47 normally exerts sufficient pressure to hold the pawl disengaged from the sun gear when the solenoid is deenergized.

Spring 72 when compressed is charged to move the pawl into one of the recesses 41 in the sun gear but if allowed to do so while the gear is rotating breakage would occur. The blocker ring 46 is arranged to prevent the entrance of the pawl under influence of spring 72 into a sun gear recess until torque reversal takes place. Winding coil 44 is arranged to have sufficient capacity to overcome the spring 47 and move the armature toward the pawl when the solenoid is energized, and the winding coil 45 is designed to have sufficient capacity to hold the armature in extended position into which it is shifted by the primary winding coil. Coil 44 is connected with contact 75 arranged to lie out of the path of movement of the armature cap and in relation to be engaged by the grounded switch arm carrying contact 74 that lies in the path of movement of the armature cap and normally engages contact 75. Thus when the armature is energized, movement of the cap flange will carry the contact 74 away from contact 75 to thus break the circuit through coil 44. The holding coil 45 is grounded so that it will hold the solenoid in the position it has been moved to by coil 44 after the circuit is broken by disengaging contacts 74 and 75. This movement of the armature does not shift the pawl rod but compresses spring 72 thus "cocking" the pawl until torque reversal takes place. Torque reversal must also take place before the pawl can be withdrawn from the sun gear recess by spring 47 during operation of the transmission, and this is accomplished by temporarily grounding the engine ignition system.

In the ignition and solenoid control system there is a relay 80 having two coils 81 and 82 controlling three plunger solenoid switches 83, 84 and 85. Connector 86 leads from line 61 to one contact of switch 83 and connector 87 leads from the other contact of switch 83 to the signal light 60 and to the primary relay coil 82. Coil 81 is connected at one end with connector 86 and at the other end with connector line 88 leading to a contact of the lock-out switch 56. One contact of switch 84 is connected with a contact of switch 85 by line 89 and the other contact of switch 84 is connected with line 64 by line 90. Coil 82 is connected with the grounded solenoid coil 45 by line 91 and one side of switch 85 is connected with a switch contact arm 95 by line 92. One end of solenoid coil 44 is connected by line 93 with line 87 leading to the light bulb 60 and the other end of this solenoid coil is connected with switch contact 75. A normally closed switch consisting of a grounded contact carrying arm 94 and contact carrying arm 95 are arranged above the switch contacts 171 and 71, the arm 94 being normally in closed position. This arm 94 is held away from contact 95 by the switch 71, 171 when the armature is in extended position in which the pawl is released from the sun gear. Switch contact 171 is connected with light bulb 60 by line 96.

When the pawl 40 is withdrawn from the sun gear so that it is free to rotate and clutch 26 is disengaged from clutch plate 21, the drive will be from shaft 10 to the tail shaft through hub 19 and the overrunning rollers 23. When the sun gear is free and clutch 26 is shifted to engage plate 21, the drive will be direct and two-way between shaft 10 and the tail shaft. When the sun gear is held stationary by the pawl 40 there will be a positive driving connection between the planetary gearing and the tail shaft so that clutch 26 must be disengaged from clutch plate 21.

As previously stated, the member 14 is slidably splined on transmission shaft 10 and its shifter 15 can be moved by suitable mechanism to positively engage clutch teeth 100 on low speed forward drive gear 11 or to engage reverse idler gear 13. In order to provide a positive drive from shaft 10 to the tail shaft when the member 14 meshes with the reverse drive gear, mechanism is provided to be actuated by the shifting mechanism for member 14 to shift clutch 26 into engagement with plate 21. Such mechanism consists of a rod 101 axially movable through casing wall D having an enlarged end 101' engaged by and shiftable with shifter member 15 when moved from neutral position into reverse drive establishing position. This stem 101 engages the bent end 102 of a rod 103 suitably mounted to slide axially in a wall of casing C. Rod 103 terminates in a reduced end 104 that extends through clutch yoke 105 and the shoulder formed by the two diameters of such rod abuts the yoke. Thus rod 103 will move the clutch yoke 105 therewith when moved rearwardly by rod 101 upon shifting of the element 14 rearwardly from neutral position to establish reverse drive. This rearward movement of the clutch yoke, upon the establishment of reverse drive in the change speed gearing, will have shifted clutch 26 to establish a positive drive between shaft 10 and the tail shaft through engagement with clutch plate 21 fixed on shaft 10, clutch 26 at all times being splined to the tail shaft.

The clutch yoke 105 has a hub portion 106 mounted on a shift rod 107 and fixed thereto by cap screw 108. The shift rod is slidably mounted in the forward and rear walls of casing C and is urged forwardly to disengage from plate 21 by coil spring 109 bearing against the yoke 105 and the rear wall of casing D. On the hub 106 is provided an abutment 110 against which a cam 111 engages. The cam is carried on the inner end of shaft 112 extending through a wall of casing C and manually operated by lever 113 to which a Bowden wire 114 (see Figs. 1 and 4) is suitably attached, such wire also being attached to a hand-operated rod 115 at the instrument board that carries a contact for controlling switch 56. When this rod is pulled rearwardly it will actuate the attached mechanism to cause the clutch 26 to be shifted into engagement with clutch plate 21 establishing a direct positive drive between shaft 10 and the tail shaft. Also by pulling the rod rearwardly, the switch 56 is opened. Thus when the driver pulls the rod 115 rearwardly, positive two-way drive from shaft 10 to the tail shaft will be established and the electrical system to the solenoid will be made dead so that the kick switch 59 and the governor switch 58 cannot function.

The governor switch 58 is arranged to be opened when the vehicle speed is below some predetermined value and to be closed above such value. The kick switch 59 is arranged to be normally closed but can be opened when the throttle pedal is pressed down beyond wide open throttle position. As the switches 56, 58 and 59 are in series they must all be closed to energize the solenoid to establish overdrive. When in direct drive with switches 56 and 59 closed, the governor switch 58 will automatically close above some predetermined vehicle speed, thus energizing the electrical control system and closing normally open switch 83 and opening normally closed switch 84 in the relay. This allows current to flow to the solenoid cocking coil 44 and to the indicator bulb 60 as well as through the second relay coil and line 91 to energize the solenoid holding coil 45. The indicator light on the instrument board reminds the driver that the mechanism is ready to be shifted to overdrive and this is accomplished by lifting the foot from the accelerator pedal thus allowing the sun gear to slow down and reverse so that the blocker will shift and allow the pawl to be shifted into a sun gear recess by the cocking coil spring 72. Pawl plunger motion in engaging direction shuts off the indicator light by opening switch 71, 171, breaks the cocking coil circuit by opening switch contacts 74, 75 and allows switch contacts 94 and 95 to engage.

Direct drive may be obtained by opening any one of the switches 56, 58 and 59. This breaks the circuit in the main relay coil 81, opening switch 83 and closing switch 84. The circuit to the second relay coil 82 is also broken but the disconnection is not immediately made because it is held by a momentary surge of current produced by the magnetic energy in the holding coil 45. During this instant, since both switches 84 and 85 are closed, the ignition is short-circuited for a brief time and the resulting hesitation of the engine, although imperceptible, removes the torque pressure from the pawl and allows its withdrawal by spring 47. Thus while in overdrive and direct drive is desired, the kick switch is opened by movement of the accelerator pedal beyond wide open throttle position, or by pulling the dash rod 115 rearwardly. Of course direct drive is also established when the governor switch automatically opens.

When the reverse gearing is engaged the clutch 26 is shifted to provide direct drive from the shaft 10 to the tail shaft and the shift rod 107 and clutch yoke 106 will be shifted together due to their securement by the set screw 108. The spring 109 acts constantly to return this clutch and rod to disconnect the positive drive. The Bowden wire 114 can be actuated to shift rod 107 and move the clutch 26 to engage plate 21 and establish direct drive from shaft 10 to the tail shaft when the reverse gearing is disengaged, this being possible because the clutch yoke can slide on the reduced end 104 of the reverse shift rod 103.

In order to prevent movement of the pawl 40 into overdrive relation when positive direct drive is established and to prevent shifting of the rod 107 to establish a positive direct drive when the pawl engages the planetary gearing, lock mechanism is provided. A shiftable lock means in the form of a detent 120 is mounted for limited sliding movement in the casing wall D in a relation to interlock with either the pawl 40 or the clutch rod 107. The pawl has a recess 121 formed therein to receive one end of the lock member when in registration and the rod is formed with an annular peripheral groove 122 to receive the other end of the lock member when in registration. The groove 122 is arranged to register with the lock member when the rod 107 is in forward position which places clutch 26 in driving relation between the planetary gearing and the tail shaft and out of position establishing direct drive from shaft 10 to the tail shaft. When the lock member registers with groove 122 it can move therein and out of the recess 121 in the pawl so that the pawl is free to be shifted. When the groove 122 is out of registration with the lock member, then the lock member is secured in the recess 121 of the pawl by the clutch rod 107, see Fig. 5. Thus when the clutch 26 is shifted for positive drive the pawl will be locked in a position removed from the planetary sun gear so that overdrive cannot be established. Likewise when the pawl engages the planetary sun gear, the recess 121 is out of registration with the lock member 120 and the lock member engages in groove 122 (see Fig. 3) preventing shifting of clutch rod 107 to establish direct drive either by the pull rod at the instrument board or by the mechanism operable by the establishment of reverse drive. The clutch 26 and the pawl 40 are thus locked to prevent their operation when the overdrive mechanism is not ready to be shifted. Through means of the element 120, the pawl serves to lock the clutch rod 107 under certain conditions and under other conditions the clutch rod 107 serves to lock the pawl. As the clutch actuator yoke hub 106 is fixed to rod 107, the reverse shift mechanism and the manual shift mechanism for clutch 26 will be locked to prevent actuation when the pawl engages the planetary sun gear and whenever either clutch actuating means has shifted clutch 26 to direct positive drive the pawl will be locked to prevent its engagement with the planetary sun gear. The overdrive mechanism herein described is foolproof because it can only be shifted when ready for the shift.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a speed modifying mechanism for coupling a driving and a driven shaft, planetary gearing geared to said driving shaft, means for holding or releasing the sun gear of the planetary gearing, a clutch member shiftable to drivingly couple the planetary gearing with the driven shaft or to positively couple said shafts, means operable to shift said clutch member including a rod and yoke fixed together, a pair of manually operable mechanisms independently operable to actuate said clutch member shift means, and means for locking said rod from movement by either one of said pair of means that would drivingly engage said shafts while said sun gear is being held.

2. In a motor vehicle transmission mechanism having a shaft driven forwardly or reversely by mechanism selectively established by shiftable clutch means, planetary gearing drivingly coupled to said shaft, a tail shaft, a controlled pawl for holding or releasing the sun gear of the planetary gearing, and a clutch member shiftable to selectively connect the driven shaft with the tail shaft or with the planetary gearing, means for actuating said clutch member comprising a shifter member engaging said clutch member, a rod on which said shifter member is fixed, two independent actuator means engaging said shifter member and operable to establish direct drive between the shafts, one of said actuator means being operated by a reverse shift movement of said clutch means, and the other actuator means being directly operable by the vehicle driver, spring means urging said shifter member out of position directly coupling said shafts, and a detent operable by said pawl to lock said rod from movement by either actuator means when said pawl is holding the sun gear.

3. In a motor vehicle transmission mechanism having a shaft driven forwardly or reversely by selected gearing, a sliding clutch means operable to selectively engage the gearing, planetary gearing coupled to said shaft and including a sun gear, a tail shaft, means for holding or releasing the sun gear and a clutch member coupling the planetary gearing and the tail shaft and shiftable to directly couple the driven shaft and the tail shaft, mechanism operable to control the clutch member comprising a slidably mounted rod, an actuator member fixed to the rod and engaging the clutch member, a spring engaging the actuator member to normally retain the clutch memebr disengaged from said drive shaft, means operable to positively cam said actuator member to move said clutch member into direct coupling relation with said shafts, and a second means having a reduced portion slidable through said actuator member and operable by the clutch means when shifted for reverse drive to abut and cam said actuator member for positively shifting said clutch member into coupling relation with said shafts.

4. In drive modifying mechanism for coupling a driving shaft and a driven shaft, planetary gearing in driven relation with said driving shaft, said planetary gearing including a sun gear, a casing in which the planetary gearing is mounted, a controlled pawl slidable in said casing to hold or release said sun gear, a clutch member normally coupling the planetary gearing with the driven shaft and shiftable to directly couple said shafts, a shiftable rod, a clutch actuator fixed on said rod, manually operable cam means connected with said actuator, abutment means manually operable to shift said actuator, a shiftable lock member in said casing interacting with said pawl and said rod to lock said pawl in released position when the shafts are directly coupled and to lock said rod and prevent the clutch member from directly coupling the shafts when said pawl is holding said sun gear.

5. In a drive modifying mechanism for coupling a driving shaft and a driven shaft, planetary gearing coupled to the driving shaft and including a sun gear, means for holding or releasing the sun gear, a clutch member coupling the planetary gearing with the driven shaft and shiftable to couple the driving shaft and driven shaft directly together, means operable to shift said clutch member including a slidable rod and a yoke fixed thereto, a pair of separate mechanisms each operable to actuate said shift means, and lock means operable between said pawl and said rod to lock the pawl in released position when the clutch member directly engages said shafts and to lock said rod when the pawl is in engaged position.

6. A speed modifying mechanism for coupling a driving shaft and a driven shaft, planetary gearing coupled to said driving shaft including a sun gear, means operable to hold or release the sun gear, a clutch member coupling said planetary gearing with the driven shaft and shiftable to directly couple said shafts, shift means for said clutch member including a shift rod and a yoke fixed to the rod, a detent operable between said rod and said sun gear holding and releasing means to lock said rod or said sun gear holding and releasing means, a coil spring bearing against said yoke to normally disengage the clutch member from coupling relation between said shafts, and a pair of separately operable actuator mechanisms for said shift means, said detent locking said rod from movement by either mechanism while the sun gear is held.

FOREST R. McFARLAND.